United States Patent [19]
Petruzzelli

[11] Patent Number: 6,073,702
[45] Date of Patent: Jun. 13, 2000

[54] GARDEN TOOL WITH ADJUSTABLE BLADES

[76] Inventor: Rocco Petruzzelli, 2 Lady Godiva Way, New City, N.Y. 10956

[21] Appl. No.: 09/090,662

[22] Filed: Jun. 4, 1998

[51] Int. Cl.$^7$ ...................................................... A01B 1/00
[52] U.S. Cl. ............................ 172/378; 172/373; 172/381
[58] Field of Search ..................... 172/371, 372, 172/373, 375, 378, 379, 381, 380; 7/114, 115, 116, 164; 294/49, 50.8, 51, 55.5

[56] References Cited

U.S. PATENT DOCUMENTS

| | | | |
|---|---|---|---|
| 203,643 | 5/1878 | Polen | 172/373 |
| 614,356 | 11/1898 | Watson | 172/373 |
| 645,702 | 3/1900 | Arlaud | 172/378 |
| 719,723 | 2/1903 | Beebe | 172/378 |
| 743,981 | 11/1903 | Hagen | 172/378 |
| 1,299,417 | 4/1919 | Bailey | 172/379 |
| 1,309,228 | 7/1919 | Tellin | 172/373 |
| 1,414,087 | 4/1922 | Kenny | 172/373 |
| 1,688,971 | 10/1928 | Kammerer | 172/373 X |
| 1,697,572 | 1/1929 | Perham | 172/378 |
| 1,740,286 | 12/1929 | Dabrowski . | |
| 1,906,906 | 5/1933 | Greider . | |
| 2,437,805 | 3/1948 | Chilcote | 172/378 |
| 4,091,879 | 5/1978 | Lomberk et al. . | |
| 4,596,113 | 6/1986 | Novoselsky . | |
| 5,435,396 | 7/1995 | Robichaux . | |
| 5,720,071 | 2/1998 | Hall | 172/378 X |

FOREIGN PATENT DOCUMENTS

| | | | |
|---|---|---|---|
| 589519 | 5/1925 | France | 172/373 |
| 379256 | 8/1923 | Germany | 172/373 |
| 603799 | 6/1948 | United Kingdom | 172/373 |

*Primary Examiner*—Victor Batson
*Attorney, Agent, or Firm*—Notaro & Michalos P.C.

[57] ABSTRACT

A garden tool is for use by a user to lay out columns of planting holes in a garden. The tool has a chassis that is sufficiently long to span a distance between columns to be laid out for the garden. A pair of blades each shaped for marking a surface of soil in the garden and for digging planting holes along a column in the garden, is fixed at an adjustable spacing to the chassis. The distance between the blades is selected to correspond to a desired distance between columns in the garden. A handle is connected to the chassis at a location between the blades, the handle being sufficiently long so that the blades are in contact with soil of the garden when a user is standing while holding the handle. The handle is adapted to allow the user to drag the blades along the soil surface in the garden to mark a pair of adjacent columns and for the user to rotate the chassis while one blade is in the soil for digging a planting hole in the soil along a column and for marking a next hole along the column to be dug by the other blade.

7 Claims, 4 Drawing Sheets

GARDEN TOOL WITH ADJUSTABLE BLADES

FIELD AND BACKGROUND OF THE INVENTION

The present invention relate to an improved and versatile garden tool which is capable of both accurately laying out a garden, and then digging planting hole for the garden.

A manual gardening tool having an elongated handle attached to a fixed pair of blades for cultivating is disclosed by U.S. Pat. No. 5,435,3960 to Robichaux. The blades are formed from a U-shaped strip with a hole for connection to a handle.

A cooking grate cleaner having several aligned, adjustably spaced teeth mounted on a horizontal plate is disclosed by U.S. Pat. No. 5,720,071 to Hall.

U.S. Pat. No. 1,740,286 to Dabrowski teaches a collapsible rake having a plurality of triangular fingers extending downwardly from the rake head. U.S. Pat. No. 1,906,906 to Grieder discloses a utility tool having a blade connection which limits the motion of the blade once it is fixed.

U.S. Pat. No. 2,437,805 to Chilcote discloses a garden cultivator having a pair of spaced blades connected to a horizontal support having an elongate handle. The lower ends of the blades are flat, triangular pieces. A rake having pivotal tines shaped as angled blades is taught by U.S. Pat. No. 4,596,113 to Novoselsky. A garden rake and cultivating tool is disclosed by U.S. Pat. No. 4,091,879 to Lomberk et al.

The following patents disclose other types of cultivators and plows, some having fixed triangular blades:

| U.S. Pat. No. | Inventor(s) |
| --- | --- |
| 91,586 | Alexander |
| 113,306 | Kennedy |
| 130,916 | Harris |
| 347,725 | Mason |
| 501,773 | Duggan |
| 778,294 | Willcox |
| 1,468,160 | Horn |
| 1,601,975 | Mauch, et al |
| 1,706,658 | Davis |
| 2,028,483 | Van Yahres |
| 4,011,612 | Atkinson |
| 4,915,179 | Hawk |
| 5,188,340 | Green |
| 5,207,466 | Ohlson |
| 5,209,469 | Laskowitz, et al |
| 5,377,374 | Green |
| 5,461,849 | Allen |
| 5,467,830 | Watson |
| 5,706,900 | Liao |

A need remains for a garden tool which is capable of laying out a garden in accurate rows and columns and which can also be used to dig planting holes for the garden, but which does not compromise on strength or simplicity of construction for the sake of versatility as is the case for many multi-function tools.

SUMMARY OF THE INVENTION

It is an object of the present invention to provide a new and useful garden tool which can layout and dig planting holes for a garden.

Accordingly, another object of the present invention is to provide a garden tool for use by a user to lay out columns of planting holes in a garden, the tool comprising:

a chassis having a length that is sufficient to span a distance between columns to be laid out for the garden; a pair of blades each shaped for marking a surface of soil in the garden and for digging planting holes along a column in the garden; space setting means for connecting the blades to the chassis at a plurality of selected distances between the blades and along the length of the chassis, the distances being selected to correspond to a desired distance between columns in the garden; and a handle connected to the chassis at a location between the blades, the handles being sufficiently long so that the blades are in contact with soil of the garden when a user is standing while holding the handle, the handle being adapted to allow the user to drag the blades along the soil surface in the garden to mark a pair of adjacent columns and for the user to rotate the chassis while one blade is in the soil for digging a planting hole in the soil along a column and for marking a next hole along the column to be dug by the other blade.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
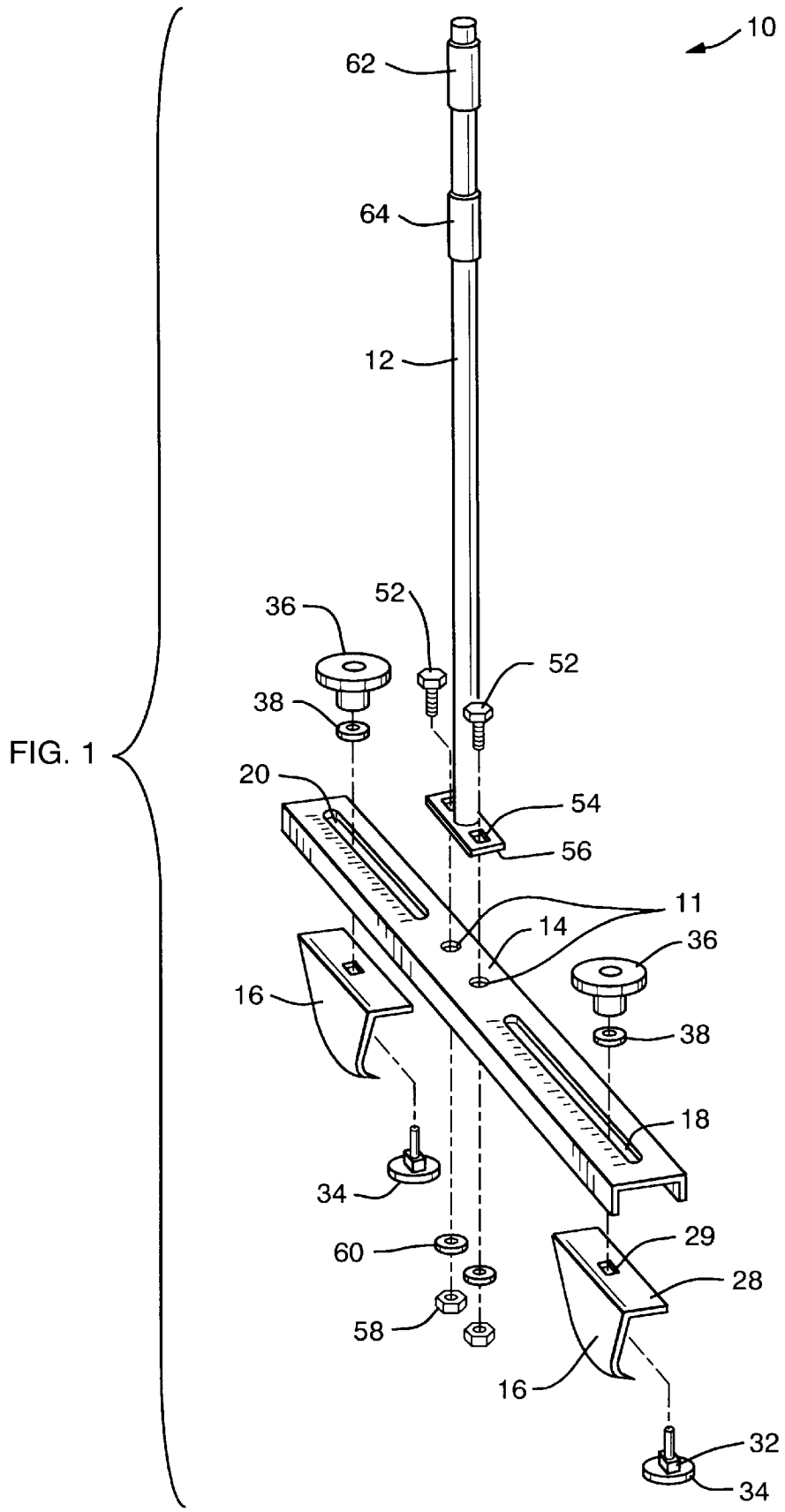
FIG. 1 is a perspective, exploded view of a garden tool of the present invention.

Referring to the drawings in particular, the invention embodied therein in FIG. 1 is a garden tool generally designated 10 comprises an elongated handle 12 connected to a horizontal chassis 14 having a pair of spaced, substantially triangular blades 16 depending therefrom. The horizontal chassis 14 is formed as a U-shaped channel of sheet steel in one embodiment of the invention, but may be an L-shaded channel 15 in another embodiment of the invention illustrated in FIG. 3.

Figure 2:
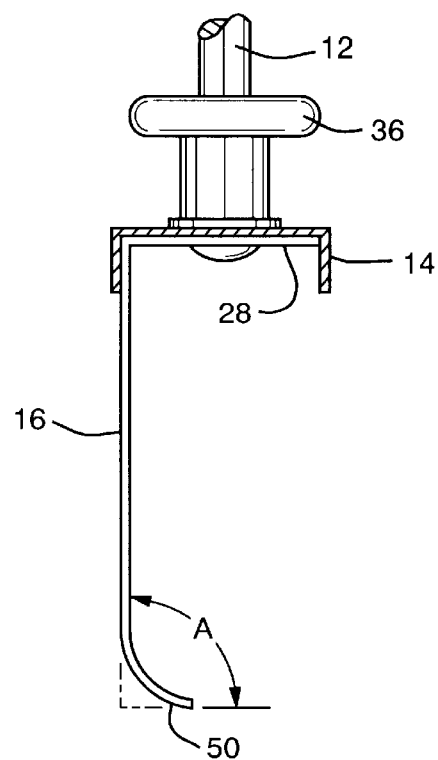
FIG. 2 is a side elevational view, partly in section of a blade and chassis of the invention.

The horizontal chassis 14 in FIGS. 1 and 2 is oriented so that the channel opens downwardly and the handle 12 is connected at or near the center of the chassis. The handle is sufficiently long so that a person using the tool may stand comfortably while the blades 16 contact the soil in the garden.

A pair of slots 18 are provided in or on the base of the chassis on either side of the handle connection location. The chassis base has markings 20 indicating a plurality of desired spacings for the blades on the chassis.

Figure 4:
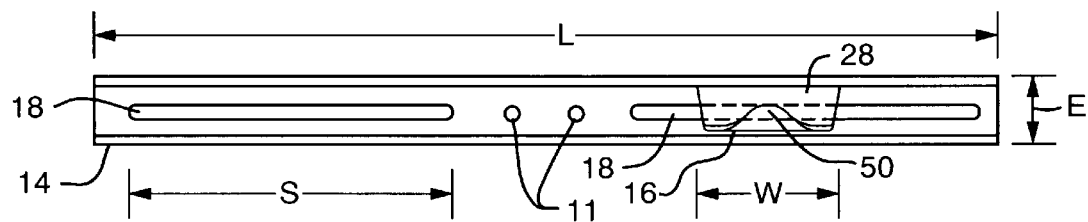
FIG. 4 is a bottom plan view of the chassis with blades of the invention.
Figure 5:
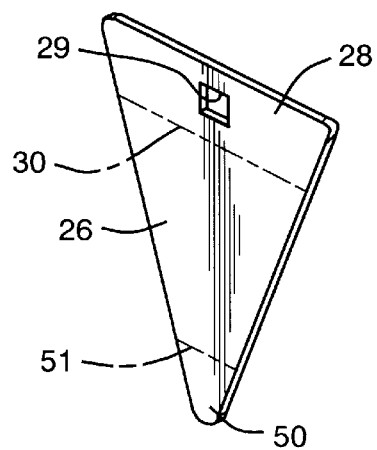
FIG. 5 is a perspective view of a blank for making the blades of the present invention.

The triangular blades are manufactures from flat, metal pieces shown at 26 in FIG. 5, having their top ends 28 bent at bend line 30 at about 90 degrees to the rest of the blade. This bent portion 28 of each blade 16 fits into the channel between opposite legs of the chassis and at the bottom of the chassis 14, as best shown in FIG. 4. It is advantageous to make the bent portion only slightly narrower than the channel so that the blade is kept from rotating with respect to the chassis. The broad flat surface of the blade is parallel to the sides of the channel and the blades extend vertically downwardly from the bottom of the channel.

The horizontal bent portion 28 of each blade 16 has a square opening 29 sized to accept the squares base 32 of a carriage bolt 34. The blades are adjustable mounted on the chassis by space setting means in the form of the slots 18 and hand knob fasteners 36 each having a threaded hole for receiving the threaded screw of each carriage bolt 34, through the openings 29 and slots 18. Washers 38 are provided between knobs 36 and the top surface of chassis 14, over slots 18.

As noted above the horizontal bent portion 28 of each blade 16 is sized to prevent rotational movement of the blade about the fastener axis within the channel. The L-shaped chassis of FIG. 3 will also prevent rotation of the blade since the single downwardly extending side of the chassis 15 engages against the vertical portion of the blade 17.

In the preferred form of the blade 16 shown in FIG. 2, the lower tip of the blade is bent to form a curved lower tooth 50 that has a lower biting end that is slightly rounded, but may be pointed and extends at an angle A. Angle A is selected to be between 0° (for a straight blade) to about 90° for the blade shown in FIG. 2. The bent tooth end 50 of blade 16 in FIG. 2 has been found to be particularly useful for scribing the parallel columns in a garden as will be explained later in this disclosure.

Figure 3:
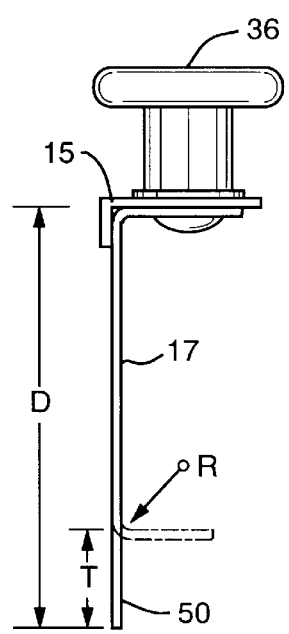
FIG. 3 is a view similar to FIG. 2, of another embodiment of the invention.

FIG. 3 illustrates another embodiment of blade 17 where the lower tip has a length T of preferably 1 to 1½ inches, the tooth being bent from the main portion of blade 17 at a radius R which is anywhere from 0 (for a sharp 90° bend) to T. If R equals T, the smooth gradual curve shown in FIG. 2 for the tooth 50 will be achieved.

Advantageously, the overall length of blade 16 or 17 shown at D is about 5 inches or within the range of 3 to 10 inches. As best shown in FIG. 4, the width at the upper end of the blade shown at W is about 3 to 3½ inches and preferably, within the range of 2 to 6 inches. Slots 18 have a preferred length S of about 6 inches, with the overall length L of chassis 14 being about 18 inches. The outer ends of the slots are spaced about ½ to 1 inch from the outer edge of the chassis, with the chassis having a width at dimension E of about 2 inches or from 1 to 3 inches. A pair of circular holes 11 is provided near the center of chassis 14 between slots 18, 18 to receive a pair of stove bolts 52 shown in FIG. 1 which extend through square holes 54 in a base plate 56 fastened, for example, by welding to the lower end of the metallic handle 12. Stove or carriage bolts 52 extend through openings 11 and receive nuts 58 with lock washers 60 to fix the handle to the chassis. Since handle 12 is meant primarily for two-hand operation, a pair of cushioned areas 62 and 64 are spaced from each other near the upper end of the handle. Although a metal handle is preferred, wood or other material handles can be used and other methods of attaching the handle to the chassis may be utilized, as is conventional for other garden tools.

As shown in FIG. 5, the lower tooth 50 can be bent from the sheet metal blank 26 at a bend line 51 with a large or small radius. Square hole 29 is punched into the bent portion 28 either before or after the bend 30 is made and advantageously blank 26 is made of relatively thick sheet steel or sheet metal, for example, ⅟₁₆ to ¼ inch thick.

The metal of chassis 14 may be thinner, perhaps ⅟₃₂ to ⅛ inch thick, but any gauge metal which is appropriate for garden tools can be utilized, depending upon how heavy-duty the tool desired.

Figure 8:
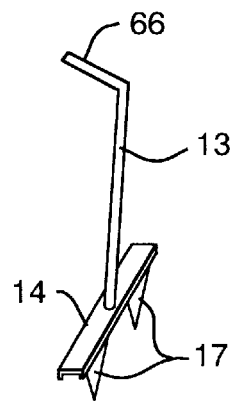
FIG. 8 is a perspective view of another embodiment of the present invention.

FIG. 8 shows another embodiment of handle 13 which has an upper bent portion 66 which bends at an angle to the main axis of the handle 33 to facilitate rotation of the tool when one of the blades 17 is used to cut a conical hole 42.

Figure 7:
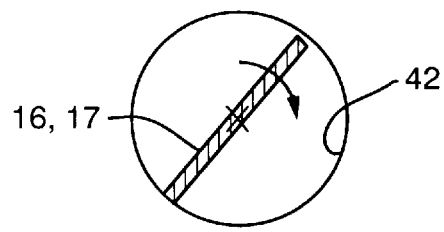
FIG. 7 is a horizontal sectional view of a blade of the present invention in a planting hole.

FIG. 7 illustrates how blade 16 or 17 rotates to form the conical hole 42.

FIG. 1 also illustrates how markings 20 can be associated with numerals which are mirror imaged on opposite sides of the center of the chassis 14. In this way, spacings between columns can be selected by placing the knobs 36 at the same numerical location in each slot 18.

For example, if knob 36 on each side of the chassis is placed at numeral 18, a channel which is about 18 inches wide is formed. At the other extreme, if both knobs are moved to the center of the chassis, a 6 inch wide channel is produced.

Figure 6:
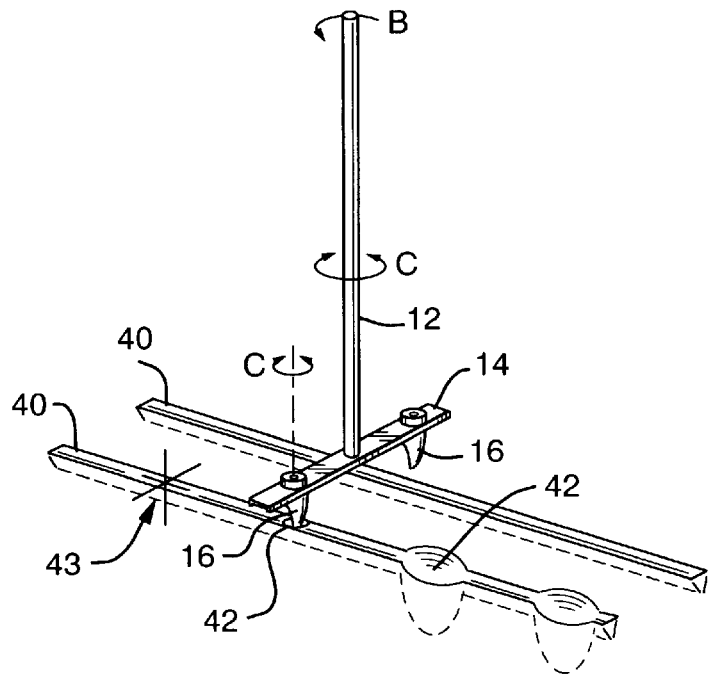
FIG. 6 is a perspective view of the garden tool of the invention being used to lay out and dig planting holes for a garden.

The garden tool is used by first spacing the two blades a predetermined distance apart along the length of chassis 14 as shown in FIG. 6. Both blades 16, 16 are put into contact with the soil and the handle 12 is used to drag the tool along the ground in a direction transverse to the length of the chassis. This produces a pair of parallel shallow furrows or lines 40 that define the first pair of columns in the garden. Additional parallel columns are then formed using the tool.

One blade is then inserted into the ground at a selected location along one column and at a spot where a bulb or seeds are to be planted.

The tool is angled in the direction B in FIG. 6 so that the other blade is elevated off the ground. The tool is rotated about the blade and handle as shown by the curved double arrows C, creating a conical hole 42 in the ground.

The tool is then pivoted so that the other blade is positioned at a subsequent spot 43 on the ground along the column, the predetermined distance from the prior hole. This distance is automatically set by the fixed distance between the blades on the chassis, and a further hole is made. This process is repeated until a row of holes has been made.

Since the tool was also used to create the furrows, an exact layout of columns and rows of holes is achieved in a very simple manner.

Although preferably, the tool is mostly made of metal, with the exception of knobs 36 which can be made of hard plastic such as ABS plastic, as noted above, handle 12 can be replaced by a wood handle. Also, the tool can be made entirely of hard plastic with the addition of appropriate gussets and reinforcements in the chassis and blade or where needed to add strength.

Figure 9:
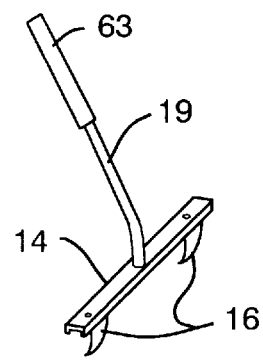
FIG. 9 is similar to FIG. 8 of a further embodiment of the invention.

FIG. 9 illustrates another embodiment of the invention utilizing a handle 19 which has a bend near its bottom but above the point of connection to the chassis 14 for angling the chassis in the manner of a rake. FIG. 9 also illustrates how padding 63 can extend continuously from the upper end of the handle along a length of the handle suitable for two-hand operation.

While specific embodiments of the invention have been shown and described in detail to illustrate the application of the principles of the invention, it will be understood that the invention may be embodied otherwise without departing from such principles.

What is claimed is:

1. A garden tool for use by a user to lay out columns of planting holes in a garden, the tool comprising:

a chassis having a length that is sufficient to span a distance between columns to be laid out for the garden, the chassis comprising a channel having a U-shaped cross-section with a base containing a pair of spaced apart slots, and opposite legs connected to the base, the channel being downwardly open and the base having a lower inner surface and an upper outer surface;

a pair of blades each shaped for marking a surface of soil in the garden and for digging planting holes along at least one of the columns in the garden, each blade having a substantially triangular body extending in a body plane that is substantially parallel to one of the legs of the channel, each blade having an upper base that is bent from the body plane into a plane of the blade base, each blade base lying against the lower inner surface of the channel base and extending between the legs of the channel for securing the blades against rotation with respect to the channel, each blade base having a hole there-through which is aligned with one of the slots in the channel base, each blade having a narrow tooth end that is remote from the chassis and that is bent at a radius and in a direction parallel to the blade base plane and under the blade base;

space setting means for connecting the blades to the chassis at a plurality of selected distances between the blades and along the length of the chassis, the distances being selected to correspond to a desired distance between the columns in the garden, the space setting means comprising a bolt means extending through the hole in each blade and through one of the slots for fixing the blades at a selected spacing from each other and to the chassis;

a handle connected to the upper outer surface of the channel at a location between the blades, the handle extending at least party parallel to the plane of each blade body and being sufficiently long so that the blades are in contact with soil of the garden when a user is standing while holding the handle, the handle being adapted to allow the user to drag the blades along the soil surface in the garden to mark a pair of adjacent ones of the columns and for the user to rotate the chassis while one blade is in the soil for digging a planting hole in the soil along one of the columns and for marking a next hole along the one of the columns to be dug by the other blade.

2. A tool according to claim 1, wherein the bolt means comprises a carriage bolt with the hole in the blade being polygonal.

3. A tool according to claim 1, including markings on the chassis extending along each of the slots.

4. A tool according to claim 3, wherein said markings adjacent each slot comprise numerals which are positioned in mirror image relationship to each other on opposite sides of the handle for indicating a spacing between the blades which, in turn, indicates a selected distance between columns to be formed with the tool.

5. A tool according to claim 1, including a bend in the handle for angling the chassis.

6. A tool according to claim 5, wherein the bend in the handle is near an upper end of the handle.

7. A tool according to claim 5, wherein the bend in the handle is at a lower end of the handle near the chassis.

* * * * *